United States Patent [19]

Takahashi

[11] Patent Number: 4,655,280
[45] Date of Patent: Apr. 7, 1987

[54] DIE COOLING PIPE

[75] Inventor: Katsuhiko Takahashi, Tokorozawa, Japan

[73] Assignee: Fuso Keigokin Co., Ltd., Tokyo, Japan

[21] Appl. No.: 858,841

[22] Filed: Apr. 30, 1986

Related U.S. Application Data

[63] Continuation of Ser. No. 593,513, Mar. 26, 1984, abandoned.

[51] Int. Cl.[4] .................. B29F 1/022; B29F 1/08; B99C 1/06
[52] U.S. Cl. ..................... 165/47; 165/142; 249/79; 425/547; 425/577; 164/348
[58] Field of Search ............... 165/47, 142; 164/348, 164/312; 425/547, 577, 810, 407, 552, 384, 548, 533; 249/79, 111, 122, 141, 126, 128, 144; 264/327, 348, 328.16, 328.14

[56] References Cited

U.S. PATENT DOCUMENTS

| 705,772 | 7/1902 | Messer | 425/384 |
|---|---|---|---|
| 2,376,373 | 5/1945 | Merckel | 165/142 |
| 2,891,282 | 6/1959 | Neitlich | 425/548 |
| 3,125,780 | 3/1964 | Harrison et al. | 425/547 |
| 3,156,015 | 11/1964 | Harrison | 264/327 |
| 3,196,198 | 7/1965 | Rex | 425/548 |
| 3,605,871 | 9/1971 | Whitehead, Sr. et al. | 425/547 |
| 3,667,248 | 6/1972 | Carlson | 164/348 |
| 3,908,754 | 9/1975 | Laing | 165/142 |
| 4,111,258 | 9/1978 | Jahns et al. | 165/142 |
| 4,260,348 | 4/1981 | Graham | 425/548 |
| 4,275,864 | 6/1981 | Richards | 249/79 |
| 4,511,322 | 4/1985 | Jakobsen et al. | 425/384 |

FOREIGN PATENT DOCUMENTS

| 2023801 | 11/1971 | Fed. Rep. of Germany | 249/79 |
|---|---|---|---|
| 2517186 | 10/1976 | Fed. Rep. of Germany | 425/547 |
| 0490477 | 2/1954 | Italy | 165/142 |
| 0126141 | 10/1981 | Japan | 425/547 |
| 0002740 | 1/1982 | Japan | 425/547 |

*Primary Examiner*—Albert W. Davis, Jr.
*Assistant Examiner*—John K. Ford
*Attorney, Agent, or Firm*—Watson, Cole, Grindle & Watson

[57] ABSTRACT

This invention relates to a two-way cooling pipe for cooling a die or mold which is used for die casting or a similar forming process. This pipe is a hollow pipe, the interior of which is divided axially by a baffle which provides a forward channel and a backward channel for the cooling water to pass. Cooling of the die is achieved by feeding cooling water to the inside of the die from the forward channel in the cooling pipe which has been inserted in the die from the back thereof, and then removing the cooling water through the backward channel of the cooling pipe.

1 Claim, 7 Drawing Figures

DIE COOLING PIPE

This application is a continuation of application Ser. No. 593,513, filed Mar. 26, 1984, now abandoned.

BACKGROUND OF THE INVENTION

This invention relates to a two-way cooling pipe for supplying cooling water in a circulating manner to the inner part of a die or mold to cool the die or mold which is used for die casting or a plastic forming process. The two-way cooling pipe is a single cooling pipe which has a forward channel and a backward channel inside for the passage of cooling water. The cooling water goes into the inner part of the die through the forward channel and, after performing heat exchange within the die, flows out through the backward channel.

As shown in FIGS. 6 and 7, a conventional two-way cooling pipe includes a forward channel and a backward channel for the passage of the cooling water with a double tube construction. Such a construction includes an outer hollow pipe a and an inner hollow pipe b having a smaller concentrically inserted therein. The inner pipe b serves as the forward channel X and the clearance between the outer pipe a and the inner pipe b serves as the backward channel for the cooling water. In the fabrication of the conventional cooling pipe with such a construction, it is necessary to insert the inner pipe b in the outer pipe a in a concentric position and connect them together by welding, brazing or soldering to the water stopper c, and also connect the water intake nozzle d to the forward channel X and the water outlet nozzle e to the backward channel Y by welding, brazing or soldering. This involves a difficult technique of inserting the inner pipe in the outer pipe concentrically and welding, brazing or soldering both pipes together in the concentric position (i.e. the so-called alignment) and the water intake and outlet pipes d, e to the outer and inner pipes a, b. These difficulties result in high production costs and leakage problems and poor water circulation. Furthermore, owing to the double pipe construction, more material is needed, resulting in an increase in material costs. These factors have made the conventional cooling pipe a very expensive device.

BRIEF SUMMARY OF THE INVENTION

The purpose of this invention is to provide a die cooling pipe which is better than the conventional ones in functioning, and which is easier and more economical to fabricate.

The inventive die cooling pipe includes a axially separating the interior of a hollow pipe into two sections; one constituting a forward channel and the other a backward channel for the passage of the cooling water. In other words, it is a cooling pipe characterized by the construction of a forward channel and a backward channel for the cooling water, consisting of a single pipe and a piece of baffle.

The purpose and the novel features of this invention will become clearer by reference to the attached drawings and the following description.

DETAILED DESCRIPTION OF THE PREFERRED EMBODIMENTS

Figure 2:
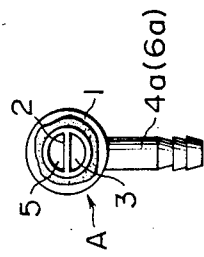
FIG. 2 is a side view of FIG. 1.

The basic construction of the die cooling pipe A of this invention consists of two pieces of material, namely a single hollow pipe 1 and a baffle 2 which separates the interior of the hollow pipe into two axial sections. One of the two sections of the hollow pipe 1, separated by the baffle 2, serves as the forward channel for the cooling water and the other section serves as the backward channel for the cooling water. Water intake hole 4 and water outlet hole 6 are provided in the forward channel 3 and the backward channel 5, respectively.

Description of each embodiment will be made with reference to the drawings.

Figure 1:
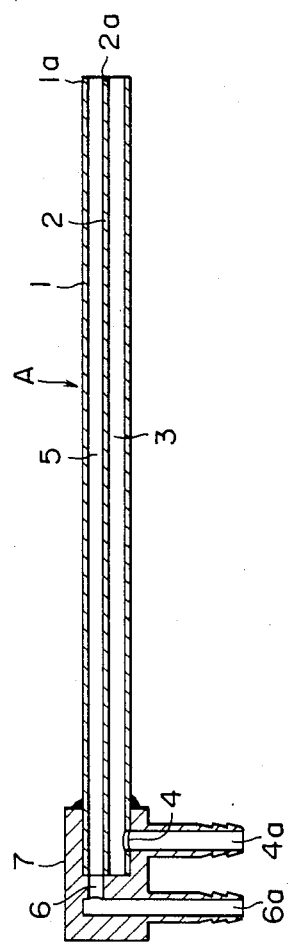
FIG. 1 is a cross section showing a first embodiment of the invention.
Figure 3:
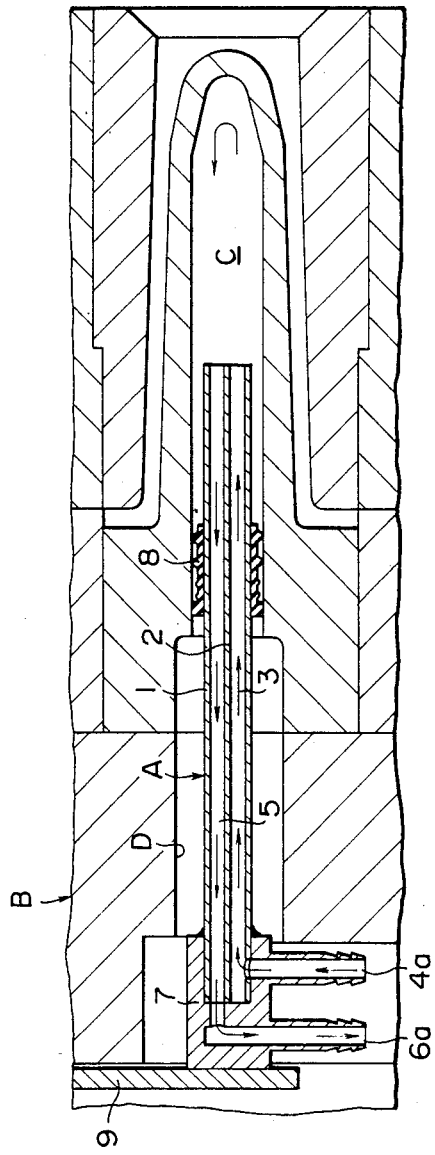
FIG. 3 is a cross section showing how the first embodiment of this invention is positioned in a die.

FIGS. 1–3 show the first embodiment of the present invention. It is composed of a hollow pipe 1, a baffle 2 separating the pipe interior axially and a water stopper 7 attached to an open end of the pipe 1. The water stopper has a water intake hole 4 and a water outlet hole 6 connecting to the forward channel 3 and the backward channel 5, respectively, so that water passes through freely. The hollow pipe 1 is made of metal such as copper, steel, aluminum or synthetic resin in the desired length and diameter. The pipe interior is separated into two sections with a baffle 2 axially from one end to the other end of the pipe. Water stopper 7 is fitted to an open end of the pipe. The baffle 2 is formed integrally with the hollow pipe 1. In other words, the hollow pipe 1 and the baffle 2 are formed in one piece and simultaneously by extrusion forming. The baffle may be formed in the form of a long plate independently from the hollow pipe 1 and then positioned in the hollow pipe 1. The other end 2a of the baffle 2 may be either flush with the other open end 1a of the hollow pipe 1, or stretched from the other open end 1a of the hollow pipe 1 into the cooling hole C of the die B. Either one of the internal sections of the hollow pipe 1 axially separated by the baffle 2 may be the forward channel 3, or the backward channel 5 for the cooling water. The interior of the hollow pipe 1 may be separated into two exactly equal sections by the baffle 2 to form the forward channel 3 and the backward channel 5 of the same width, or it may be differently separated to make the forward channel 3 narrower than the backward channel 5 because of the thermal expansion of cooling water within the cooling hole C and in order to reduce the frictional resistance in the backward channel of the cooling water.

The water stopper 7 attached to one end of the hollow pipe 1 has a water intake hole 4 and a water outlet hole 6 respectively connected to the forward channel 3 and the backward channel 5. In this embodiment, a water intake nozzle 4a and a water outlet nozzle 6a to be connected to the external water supply and outlet pipes (not shown) are formed outwardly in one piece with the water stopper. The stopper 7 is formed integrally with the intake nozzle 4a and a water outlet nozzle 6a by die casting and welded or brazed or soldered to an open end of the hollow pipe 1.

When it is used, the cooling pipe is fitted with a seal 8 or packing around it near the top end and inserted into the cooling hole C through a hole D in the back of the die B, the water intake nozzle 4a and the water outlet nozzle 6a being connected to the external water supply pipe and the external water outlet pipe, respectively. The portion 9 in the illustration is a holding plate to prevent the cooling pipe A from falling off the die B accidentally. The water for cooling the die B runs through the forward channel 3 from the water intake nozzle 4a of the cooling pipe A and gushes into the cooling hole C of the die B where heat exchange takes place. The cooling water which has exchanged heat flows out of the die B, running through the backward channel 5 and the water outlet nozzle 6a.

The first embodiment of die cooling pipe described above dispenses with the double pipe construction of the conventional cooling pipe to form the forward and backward channels in a single pipe. As a result, it can solve all the fabricating inconveniences and shortcomings of the conventional cooling pipe and can be supplied at a low price as an efficient cooling pipe. Furthermore, because the baffle, which forms the forward channel and the outward channel within the hollow pipe, can be made in one piece with the pipe by extrusion forming, the fabrication becomes simple and reduces material cost compared with the conventional cooling pipe. These factors combined contribute to the supply of even more low-priced cooling pipes.

Figure 4:
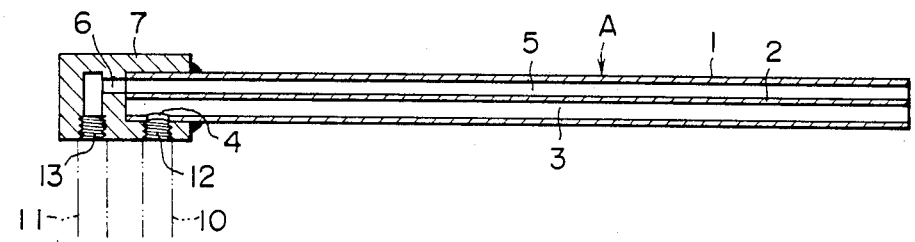
FIG. 4 is a cross section showing a second embodiment of this invention.

The second embodiement of the invention, shown in FIG. 4, has a water stopper 7 which is slightly different in construction. In this construction, the water stopper 7 which is mounted on an open end of the hollow pipe 1 has a water intake hole 4 and a water outlet hole 6 connected to the forward channel 3 and the backward channel 5 of the hollow pipe 1, respectively, both the water intake hole 4 and the water outlet hole 6 being tapped holes for screw-in connection with the external water supply and outlet pipes. Therefore, this embodiment achieves the same performance as the aforementioned first embodiment.

Figure 5:
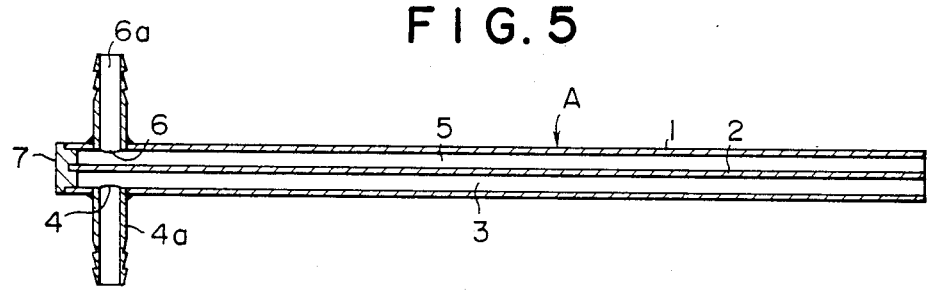
FIG. 5 is a cross section showing a third embodiment of this invention.
Figure 6:
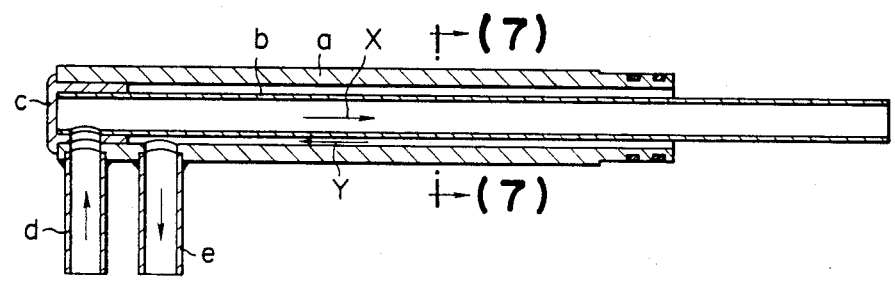
FIG. 6 is a cross section showing a conventional die cooling pipe.
Figure 7:
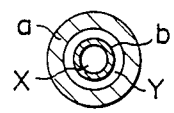
FIG. 7 is a cross section at along line 7—7 of FIG. 6.

In the third embodiment of this invention, shown in FIG. 5, the hollow pipe 1 has a water stopper 7 on an open end, a water intake hole 4 and a water outlet hole 6 drilled through the forward channel side and the backward channel side, respectively, and a water intake nozzle 4a and a water outlet nozzle 6a both integrally fitted to the cooling pipe for connection to the external water supply and outlet pipes. Therefore, this embodiment is also as effective as the aforementioned first embodiment.

What is claimed is:

1. A die cooling pipe for use with a die having a cooling hole therein, said die cooling pipe comprising
    a hollow pipe which includes a sidewall and which defines opposite first and second ends, said second end being uncovered, said hollow pipe also including a water intake hole in said sidewall near the first end thereof,
    a single integral baffle which extends axially within said hollow pipe from said first end thereof to said second end thereof, said baffle dividing said hollow pipe into an axial forward water channel and an axial backward water channel, said hollow die pipe and said baffle being integrally formed by extrusion forming,
    a water stopper fixedly attached to said first end of said hollow pipe, said water stopper including a main portion, an integral water inlet nozzle extending away from said main portion and an integral water outlet nozzle extending away from said main portion, said water stopper including a water inlet passageway which extends through said water inlet nozzle and communicates with said water intake hole in said sidewall of said hollow pipe and a water outlet passageway which extends through said water outlet nozzle and communicates with said backward water channel in said hollow pipe, and
    a seal means extending around the sidewall of said hollow pipe,
    said die cooling pipe being insertable into the cooling hole in said die so that cooling water which has passed through said water inlet passageway, through said water intake hole and along said forward water channel will flow out said second end of said hollow tube and into said cooling hole to cool said die, then flow into and along said backward water channel and through said water outlet passageway.

* * * * *